United States Patent
Yang et al.

(10) Patent No.: US 8,417,279 B2
(45) Date of Patent: Apr. 9, 2013

(54) TECHNIQUES TO CONTROL TRANSMITTER POWER LEVEL

(75) Inventors: Rongzhen Yang, Shanghai (CN); Ali Koc, Hillsboro, OR (US); Wei Guan, Shanghai (CN); Hujun Yin, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 799 days.

(21) Appl. No.: 12/381,568

(22) Filed: Mar. 13, 2009

(65) Prior Publication Data

US 2010/0234059 A1    Sep. 16, 2010

(51) Int. Cl.
*H04B 7/00* (2006.01)
*H04B 17/00* (2006.01)

(52) U.S. Cl. ........ 455/522; 455/450; 455/69; 455/67.11

(58) Field of Classification Search .................. None
See application file for complete search history.

(56) References Cited

U.S. PATENT DOCUMENTS

| | | | |
|---|---|---|---|
| 6,952,591 B2* | 10/2005 | Budka et al. ................. 455/517 |
| 7,561,894 B2* | 7/2009 | Nishio et al. ................. 455/522 |
| 7,787,430 B2* | 8/2010 | Kaikkonen et al. ........... 370/342 |
| 2002/0105929 A1* | 8/2002 | Chen et al. ................... 370/335 |
| 2004/0224697 A1* | 11/2004 | Hakkinen et al. ............ 455/450 |
| 2005/0255873 A1* | 11/2005 | Zhang et al. ................. 455/522 |
| 2007/0041429 A1* | 2/2007 | Khandekar .................. 375/146 |
| 2007/0076654 A1* | 4/2007 | Bachl et al. .................. 370/329 |
| 2007/0178927 A1* | 8/2007 | Fernandez-Corbaton et al. ............................ 455/522 |
| 2008/0109693 A1* | 5/2008 | Maas et al. ................... 714/748 |
| 2009/0069017 A1* | 3/2009 | Usuda et al. .................. 455/442 |
| 2010/0246520 A1* | 9/2010 | Andersson ................... 370/329 |
| 2010/0265862 A1* | 10/2010 | Choi et al. ................... 370/311 |

* cited by examiner

*Primary Examiner* — Crystal L Hammond
(74) *Attorney, Agent, or Firm* — Cool Patent, P.C.; Kenneth J. Cool; Joseph P. Curtin

(57) ABSTRACT

A channel normally used to transmit acknowledgement of successful signal receipt and an indication of unsuccessful signal receipt is adopted to transmit power control information from a base station to a mobile station. The power control information can be encoded as a binary code where each value of the code is indicated by an acknowledgement or non-acknowledgement signal.

18 Claims, 3 Drawing Sheets

TECHNIQUES TO CONTROL TRANSMITTER POWER LEVEL

FIELD

The subject matter disclosed herein relates generally to techniques to control power level of signals transmitted by a mobile station.

RELATED ART

Orthogonal FDM (OFDM) and Orthogonal Frequency Division Multiple Access (OFDMA) are common multiple access technique used in broadband wireless networks. Uplink power control is an extremely important part of OFDM and OFDMA systems for controlling the transmit power level. Uplink power control seeks to optimize the link performance and terminal battery power life while reducing inter-base station uplink co-channel interference. Uplink power control methods can be categorized generally as Open-Loop Power Control (OLPC) and Closed-Loop Power Control (CLPC). OLPC offers an advantage of low signaling overhead but has low accuracy of control of transmitter power. CLPC offers an advantage of high-accuracy control of transmitter power, but has high signaling overhead.

"DRAFT Standard for Local and metropolitan area networks—Part 16: Air Interface for Broadband Wireless Access Systems," by IEEE 802.16 (2008) describes an example CLPC power control mechanism in which transmitter power level is controlled by an offset signaled by a base station expressed as following formula:

$$P_{new} = P_{last} + (C/N_{new} - C/N_{last}) - (10 \log_{10}(R_{new}) - 10 \log_{10}(R_{last})) + \text{offset}$$

The base station transmits the offset information to a mobile station using a Fast Power Control (FPC) Message, Power Control Information Elements (IE), and RNG-RSP for periodic ranging. Transmitting the offset information using CLPC, however, introduces high signaling overhead.

It is desirable to have a mobile station power-control mechanism that can support rapid and accurate changes in power level with lower signaling overhead.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Figure 1:
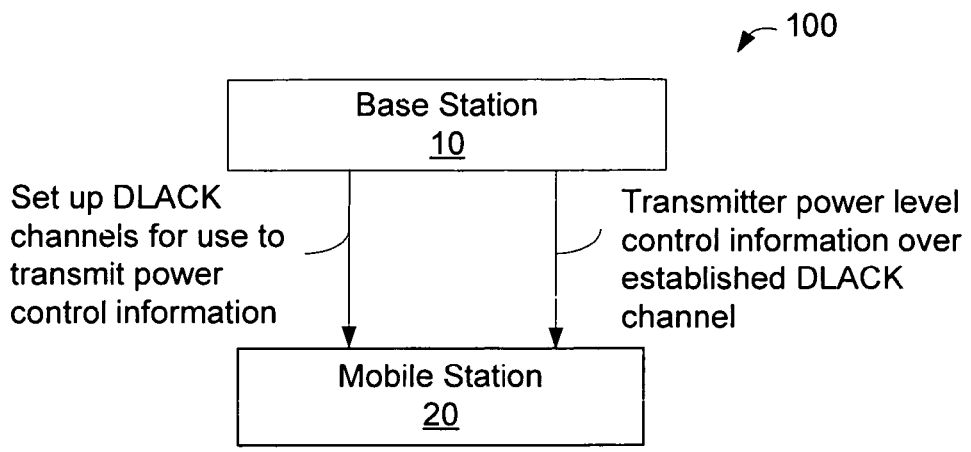
FIG. 1 depicts a system in which a base station communicates with a mobile station, in accordance with an embodiment.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e, 802.16m, or 3GPP standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth (RTM), ZigBee (TM), or the like. Embodiments of the invention may be used in various other apparatuses, devices, systems and/or networks. IEEE 802.11x may refer to any existing IEEE 802.11 specification, including but not limited to 802.11a, 802.11b, 802.11e, 802.11g, 802.11h, 802.11i, and 802.11n.

Hybrid automatic repeat-request (HARQ) streams are described in IEEE 802.16 (2005) and 3GPP LTE (2008). HARQ is a link-adaptation technique in which link-layer acknowledgements are used for re-transmission decisions at the physical layer. For each burst transmitted in a link, a receiver may or may not receive the burst properly. If the burst is received properly, an acknowledged (ACK) message is returned. If, however, the burst is not received properly, a not-acknowledged (NACK) message is returned. Upon receipt of an ACK message, further data bursts can be sent.

Upon receipt of a NACK message, a retry attempt can be made to resend the same burst information. Some embodiments include using existing HARQ-feedback ACK/NACK channel for power-control techniques. After establishing that a base station and mobile station are to use ACK/NACK channels to communicate power-control information, a base station encodes a power-control signal as ACK or NACK signals and transmits the ACK or NACK signals to the mobile station. The mobile station decodes the ACK or NACK signals to determine the desired power level. Some embodiments provide rapid power control with relatively low control-signal overhead. Some embodiments can be used when a mobile station suffers fast channel variations, such as when the mobile station is moving at high speed. Techniques can be applied to next generation OFDM or OFDMA-based wireless broadband technologies and related products, such as, but not limited to, IEEE 802.16e (2008), 802.16m (2008), 3GPP LTE (2008), and 3GPP UMB (2008).

FIG. 1 depicts an example of a wireless communication system that includes a base station 10 that communicates with a mobile station 20, in accordance with an embodiment. In various embodiments, base station 10 uses one or more downlink (DL) ACK channels to transmit commands to mobile station 20 to adjust transmitted power level of signals from mobile station 20. In various embodiments, a pair of DL ACK Channels (DLACKCH) provides a downlink Power Control Channel (DLPCCH) to support fast uplink closed-loop power control. In some embodiments, one or more bits of information can be transmitted using the DLPCCH to adjust power transmitted from mobile station 20. A bit can be transmitted by an ACK or NACK signal in each of the DL ACK channels. Accordingly, a bit of information can be transmitted over each DL ACK channel to control transmitter power of mobile station 20. In other embodiments, parameters other than mobile station transmitter power may be controlled using ACK channels. For example, the ACK channels can be used to provide the feedback for DL Hybrid ARQ, as described at section 8.4.16.3 (UL ACK Channel) of IEEE 802.16 (2008).

Base station 10 may transmit signals to mobile station 20 to establish use of DL ACK channels to control transmitted power level. In some embodiments, base station 10 may set up or remove use of DL ACK channels with mobile station 20 to control power level using MAC messages (e.g., PMC_REQ/PMC_RSP). In addition, MAC messages can be used to establish a default power-level increment. MAC messages are described, for example, in IEEE 802.16 (2005).

Techniques may (1) have minor signaling overhead, compared to other existing CLPC mechanisms, (2) may provide the possibility for the system to implement fast and accurate link power adaptation in the case of fast channel variations (such as a fast-moving mobile station), and (3) may provide more accurate power control, thereby providing high data rates for users.

The following table provides an example of information mapping between control bits and two DLACK channels (A and B) transmitted to a mobile station. Other, numbers of ACK channels, however, be used.

|  | Control bit value | | | |
|---|---|---|---|---|
|  | 0x00 | 0x01 | 0x02 | 0x03 |
| DLACK channel A | ACK | ACK | NACK | NACK |
| DLACK channel B | ACK | NACK | ACK | NACK |

Accordingly, to transmit a 00 value, DLACK channels A and B carry ACK signals. To transmit a 01 value, DLACK channel A carries an ACK signal but channel B carries a NACK signal. To transmit a 10 value, DLACK channel A carries a NACK signal, but channel B carries an ACK signal. To transmit a 11 value, DLACK channels A and B carry NACK signals.

The following provides an example of power correction values associated with control-bit values.

| Control-bit values | Power-correction value |
|---|---|
| 0x00 | −Offset_Step |
| 0x01 | 0 dB |
| 0x02 | +Offset_Step |
| 0x03 | +2 * Offset_Step |

Offset_Step may be set to 0.5 dB as a default value and then changed for each mobile station using a MAC message (e.g., POC_REQ/POC_RSP).

Figure 2:
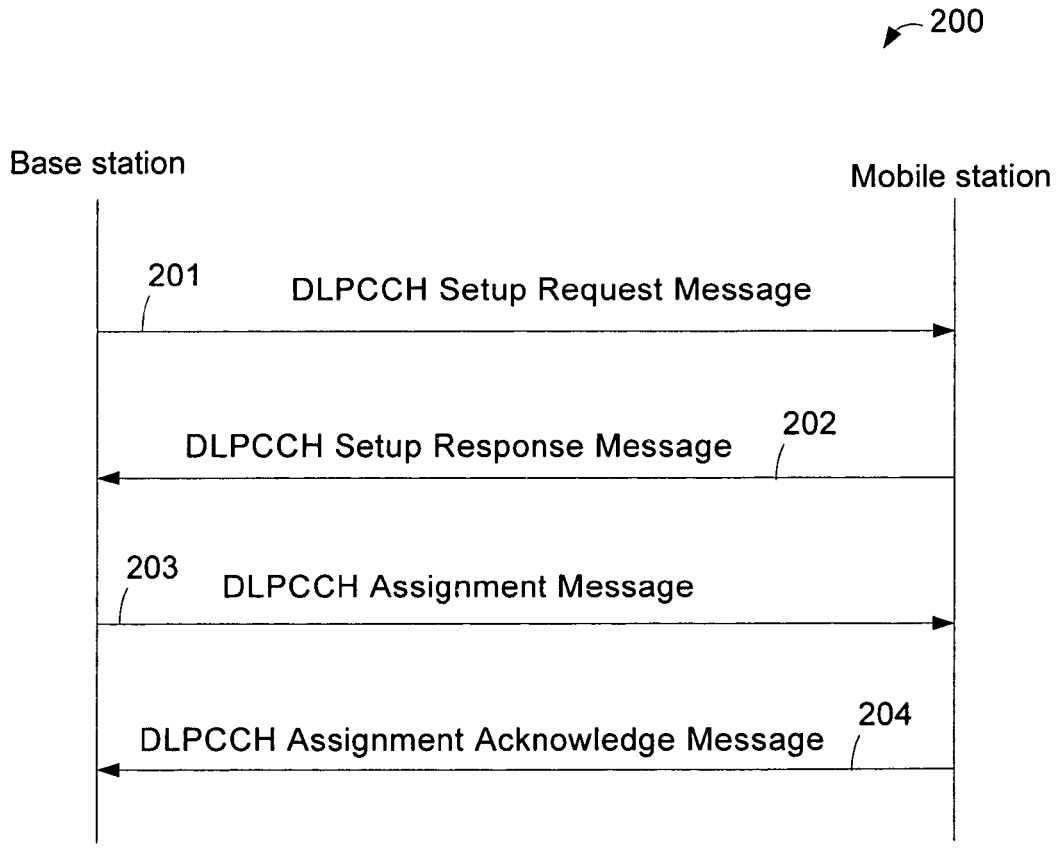
FIG. 2 depicts a power control information setup process that is initiated by a base station, in accordance with an embodiment.

FIG. 2 depicts a process in which a base station establishes uses of downlink ACK channels to transmit power-control information to a mobile station, in accordance with an embodiment. At 201, the base station transmits a DLPCCH setup request message to a selected mobile station. The base station may use a MAC message to transmit the DLPCCH setup request message. For example, contents of the setup request message can include the fields in the following table.

| Field | Concise Description |
|---|---|
| Message_Type_Indication | Value indicates the type of message. |
| CID | The value indicates the Connection Identifier. Can be used to indicate the mobile station. |
| Type/length/value (TLV) Encoded Information | TLV is described in section 11 of IEEE 802.16 (2008). |

At 202, after correctly receiving the DLPCCH setup request message, the mobile station transmits a DLPCCH setup response message to the base station to accept or reject the DLPCCH setup process. For example, the mobile station could decide to reject use of DLPCCH based on lack of capacity by the mobile station. For example, a mobile station may decide to reject use of DLPCCH because the mobile station cannot support the fast power changing due to its power amplifier design. An example setup response message can include the fields in the following table.

| Field | Concise Description |
|---|---|
| Message_Type_Indication | Indicates the type of message |
| Answer | Indicates mobile station accepts or rejects the setup process. |
| TLV Encoded Information | TLV is described in IEEE 802.16 (2008) |

At 203, after the base station receives the DLPCCH setup response message from the mobile station, if the mobile station accepts the DLPCCH setup, the base station transmits the DLPCCH assignment message to the mobile station. The DLPCCH assignment message may indicate which DLACK channels are used to transmit power-control information. The DLPCCH assignment message may be transmitted using a MAC message. If, however, the mobile station rejects the DLPCCH setup at 202, the process stops.

At 204, if the mobile station correctly receives the DLPCCH assignment message from the base station, the mobile station transmits a DLPCCH assignment acknowledge message to the base station to finish the setup process. The DLPCCH assignment acknowledge message may be transmitted in a MAC message. An example assignment acknowledge message can include the fields in the following table.

| Field | Concise Description |
| --- | --- |
| Message_Type_Indication | Indicates the type of message |
| Resource Location | Indicates assigned location of DLPCCH values. These locations are two 8 bits indices of used DLACKCH. |
| TLV Encoded Information | TLV is described in IEEE 802.16 (2008). |

Figure 3:
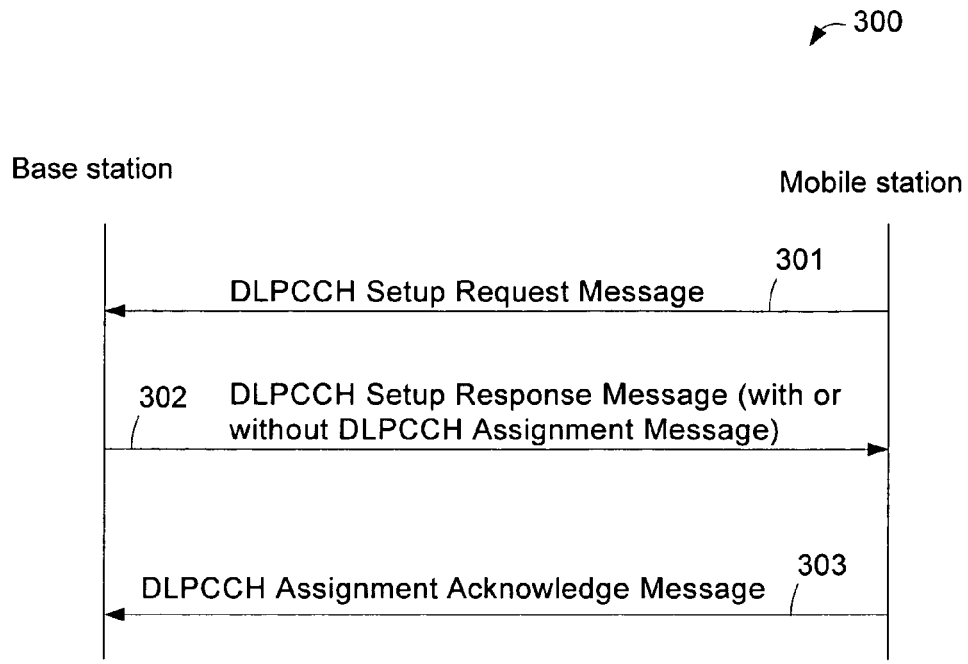
FIG. 3 depicts a power control information setup process that is initiated by a mobile station, in accordance with an embodiment.

FIG. 3 depicts a DLPCCH setup process that is initiated by a mobile station, in accordance with an embodiment. At 301, the mobile station transmits a DLPCCH Setup Request Message to the base station to initiate use of DLACK channels to communicate power-control information. Contents of the setup request message may be similar to those described earlier with regard to FIG. 2.

At 302, the base station makes the decision to accept or reject the request based on current resources and mobile-station priority. If the base station accepts the DLPCCH setup request from the mobile station, the base station transmits a DLPCCH setup response message along with a DLPCCH assignment message to the mobile station. If the base station rejects the DLPCCH setup request from the mobile station, the base station transmits a DLPCCH setup response message to the mobile station without a DLPCCH assignment message. The DLPCCH assignment message may indicate which DLACK channels are used to transmit power-control information. Contents of the setup response message may be similar to those described earlier with regard to FIG. 2.

At 303, after correctly receiving the DLPCCH setup response message from the base station, the mobile station may transmit the DLPCCH assignment acknowledge message to the base station to complete initialization. Contents of the assignment acknowledge message may be similar to those described earlier with regard to FIG. 2.

Figure 4:
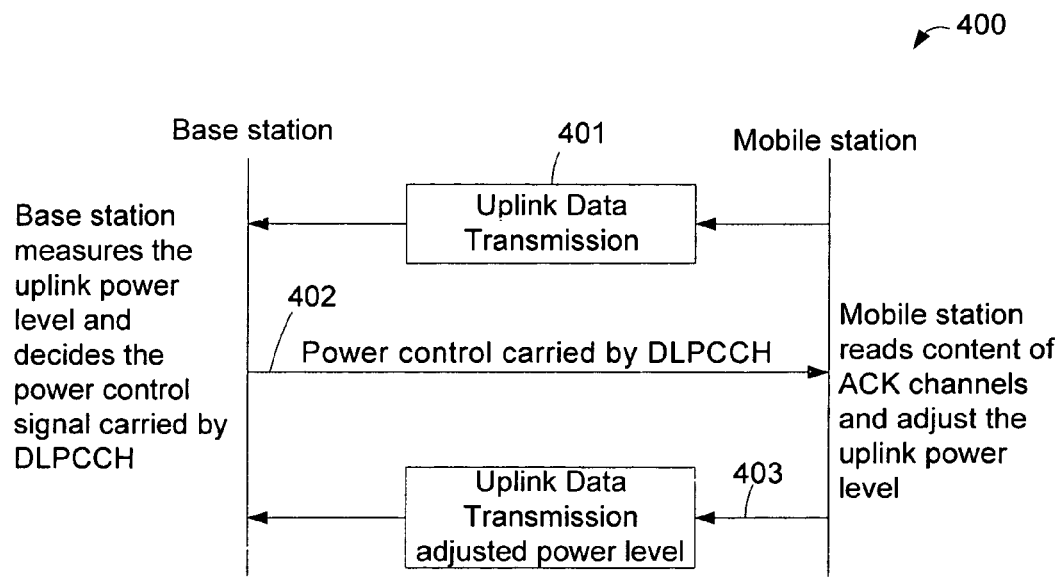
FIG. 4 depicts an example in which a base station controls the uplink data transmission power level of a mobile station, in accordance with an embodiment.

FIG. 4 depicts an example process in which a base station controls the uplink data transmission power level of a mobile station, in accordance with an embodiment. Process 400 may take place after DLACK channels have been established to control transmitter power level. At 401, the mobile station transmits data to the base station. The data may be transmitted during a CLPC period. In response, the base station measures the uplink power level and decide the appropriate transmitter power level of the mobile station. At 402, the base station transmits power level control information to the mobile station using the established DLACK channels. At 403, the mobile station may adjust the uplink transmit power level based on the indications in the power control information transmitted at 402.

Figure 5A:
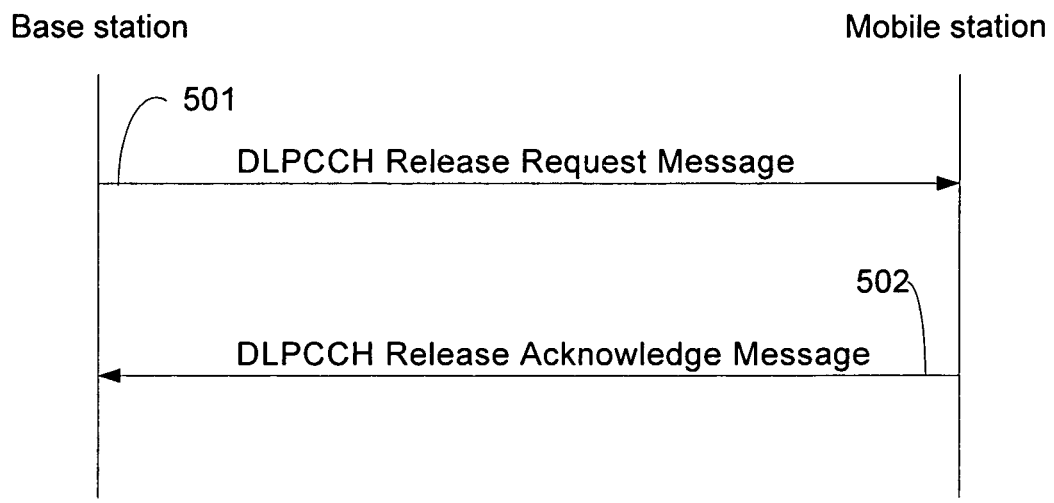
FIGS. 5A and 5B depict processes in which a respective base station and mobile station initiate release of use of acknowledge channels to communicate power control information, in accordance with various embodiments.
Figure 5B:
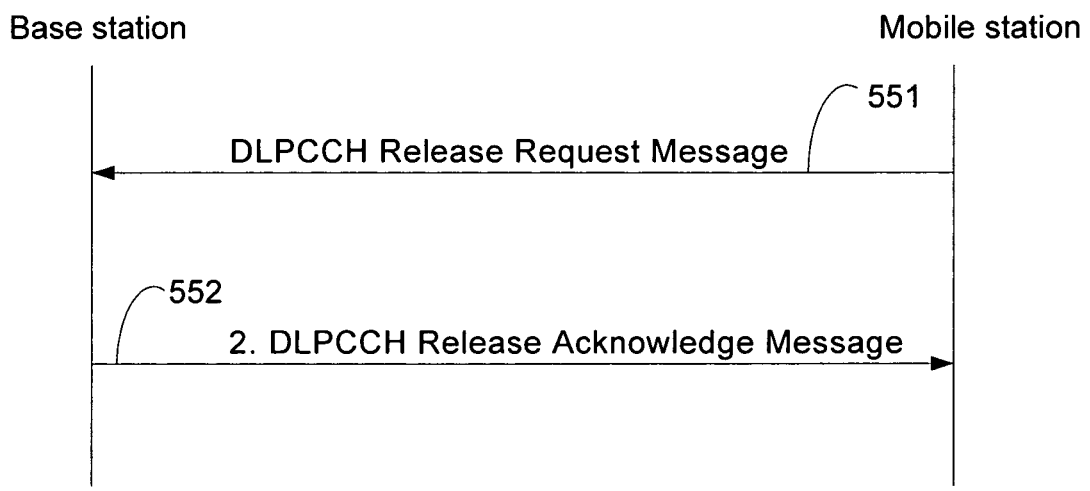

FIGS. 5A and 5B depict processes in which a respective base station and mobile station initiate release of use of DLPCCH, in accordance with various embodiments. In 501 of FIG. 5A, a base station initiates the release by transmitting a DLPCCH release request message to the mobile station. Example contents of the release request message can include the fields in the following table.

| Field | Concise Description |
| --- | --- |
| Message_Type_Indication | Indicates the type of message as being a release request message. |
| TLV Encoded Information | TLV is described in IEEE 802.16 (2008) |

At 502, after the message has been correctly received, the mobile station transmits DLPCCH Release Acknowledge Message to the base station to finish the MAC messages process. Example contents of the release acknowledge message may be as follows.

| Field | Concise Description |
| --- | --- |
| Message_Type_Indication | Indicates the type of message as a release acknowledge message. |
| TLV Encoded Information | TLV is described in IEEE 802.16 (2008) |

The PHY resources of the base station and mobile station occupied by the utilized DLACK channels will be released. PHY resources that are released can be assigned to one or more other mobile stations. For example, when fast power control is requested, a PHY resource, for example, as defined in section 8.4.16.3 UL ACK Channel of IEEE 802.16 (2008), can be assigned.

In 551 of FIG. 5B, a mobile station initiates release of use of DLPCCH by transmitting the DLPCCH release request message to the base station. At 552, after the message has been correctly received, the base station transmits the DLPCCH release acknowledge message to the mobile station to finish the MAC messages process. The PHY resources of the base station and mobile station occupied by the utilized DLACK channels will be released. PHY resources that are released can be assigned to one or more other mobile stations. For example, when fast power control is requested, a PHY resource, for example, as defined in section 8.4.16.3 UL ACK Channel of IEEE 802.16 (2008), can be assigned.

Embodiments of the present invention may be provided, for example, as a computer-program product which may include one or more machine-readable media having stored thereon machine-executable instructions that, when executed by one or more machines, such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magnetooptical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method, comprising:
   receiving signals through a feedback channel link comprising at least two ACK/NACK feedback channels;
   receiving a request to use the feedback channel link to transmit power-control information, and
   receiving power-control information through the feedback channel link, the received power-control information being specified using ACK and NACK signals transmitted on the at least two ACK/NACK feedback channels of the feedback channel link, and control-bit values associated with corresponding power-correction values being mapped using the ACK and NACK signals.

2. The method of claim 1, wherein the feedback channel link comprises a HARQ ACK channel.

3. The method of claim 1, wherein the feedback channel link comprises at least two channels capable of being configured to transmit the ACK or NACK signals in accordance with IEEE 802.16 (2005).

4. The method of claim 1, wherein the receiving a request to use the feedback channel link comprises receiving a request in a MAC message.

5. The method of claim 1, further comprising receiving a default power offset value.

6. The method of claim 5, further comprising:
   adjusting a transmit power level from a mobile station based in part on the power-control information and the default power offset value.

7. The method of claim 1, wherein the power-control information comprises a two-bit control signal.

8. The method of claim 1, further comprising:
   measuring uplink power level from a mobile station;
   determining a second uplink power level based in part on the measured uplink power level;
   encoding the second uplink power level as one or more of ACK and NACK signals; and
   transmitting the second uplink power level using the one or more of ACK and NACK signals in the power-control information.

9. The method of claim 1, wherein a mobile station receives the request to use the feedback channel link to transmit power-control information.

10. The method of claim 1, wherein a base station receives the request to use the feedback channel link to transmit power-control information.

11. The method of claim 1, further comprising:
    adjusting a transmitter power based in part on the power-control information.

12. A mobile station, comprising:
    logic to receive a message from a feedback channel link, the feedback channel link comprising at least two ACK/NACK feedback channels capable of being configured to transmit ACK or NACK signals;
    logic to decode a message received from the feedback channel link, the received message indicating a transmitter power amount and comprising ACK and NACK signals received from the at least two ACK/NACK feedback channels of the feedback channel link, the transmitter power amount being specified using one or more of the ACK and NACK signals, and control-bit values associated with corresponding power-correction values being mapped using the ACK and NACK signals; and
    logic to transmit signals at a power level based in part on the transmitter power amount.

13. The mobile station of claim 12, wherein the feedback channel link comprises a HARQ ACK channel.

14. The mobile station of claim 12, further comprising logic to receive a default power offset value.

15. The mobile station of claim 14, further comprising logic to adjust the transmitter power level based in part on the default power offset value and the transmitter power amount.

16. The mobile station of claim 12, further comprising:
    at least one antenna, and
    an 802.11 compatible transceiver.

17. A base station, comprising:
    logic to determine a transmitter power level of a mobile station based in part on one or more signals received from the mobile station;
    logic to specify an amount to adjust the transmitter power level of the mobile station using one or more ACK and NACK signals to map control-bit values associated with corresponding power-correction values; and
    logic to transmit the specified amount to adjust the transmitter power level in the mapped ACK and NACK signals using a feedback channel link comprising at least two ACK/NACK feedback channels capable of transmitting HARQ ACK signals.

18. The base station of claim 17, wherein the logic to determine the transmitter power level is to:
    measure uplink power level from the mobile station, and
    determine the transmitter power level of the mobile station based in part on the measured uplink power level.

* * * * *